(12) United States Patent
Mugnier et al.

(10) Patent No.: US 10,137,579 B2
(45) Date of Patent: Nov. 27, 2018

(54) ANTI-JAMMING SYSTEM IN A HUMANOID-TYPE ROBOT

(71) Applicant: SOFTBANK ROBOTICS EUROPE, Paris (FR)

(72) Inventors: Fabien Mugnier, Paris (FR); Vincent Clerc, Clamart (FR)

(73) Assignee: SOFTBANK ROBOTICS EUROPE, Paris (FR)

( * ) Notice: Subject to any disclaimer, the term of this patent is extended or adjusted under 35 U.S.C. 154(b) by 0 days.

(21) Appl. No.: 15/310,704

(22) PCT Filed: Jun. 3, 2015

(86) PCT No.: PCT/EP2015/062459
§ 371 (c)(1),
(2) Date: Nov. 11, 2016

(87) PCT Pub. No.: WO2015/185671
PCT Pub. Date: Dec. 10, 2015

(65) Prior Publication Data
US 2017/0080582 A1   Mar. 23, 2017

(30) Foreign Application Priority Data
Jun. 3, 2014 (FR) .................................. 14 55028

(51) Int. Cl.
*B25J 19/06* (2006.01)
*B25J 19/00* (2006.01)

(52) U.S. Cl.
CPC ........... *B25J 19/0091* (2013.01); *B25J 19/06* (2013.01)

(58) Field of Classification Search
CPC ....... F16H 21/10; B66F 17/006; B66F 11/044
See application file for complete search history.

(56) References Cited

U.S. PATENT DOCUMENTS

| 2004/0236469 A1 | 11/2004 | Moridaira et al. |
| 2005/0102037 A1 | 5/2005 | Matsuda |
| 2011/0067521 A1 | 3/2011 | Linn et al. |

FOREIGN PATENT DOCUMENTS

| JP | 2000-158378 A | 6/2000 |
| JP | 2004-174644 A | 6/2004 |
| JP | 2005-254454 A | 9/2005 |
| JP | 2010-137288 A | 6/2010 |
| RU | 2251480 C2 | 5/2005 |
| WO | 2002058896 A1 | 5/2004 |

OTHER PUBLICATIONS

English Translation of JP2000-158378.*
English Translation of PCTISA237 for PCTEP2015062459.*

* cited by examiner

*Primary Examiner* — Victor L MacArthur
(74) *Attorney, Agent, or Firm* — Baker & Hostetler LLP

(57) ABSTRACT

A humanoid-type robot comprises two elements and an articulation with at least one degree of freedom linking the two elements, the articulation allowing a travel in a given range in operational operation, a first of the two elements being intended to come into contact with an abutment belonging to a second of the two elements at the end of the range. According to the invention, the robot further comprises at least one switch. The switch is configured to actuate an electrical contact when a force exerted by the first element against the abutment exceeds a given force.

4 Claims, 5 Drawing Sheets

ANTI-JAMMING SYSTEM IN A HUMANOID-TYPE ROBOT

CROSS-REFERENCE TO RELATED APPLICATIONS

This application is a National Stage of International patent application PCT/EP2015/062459, filed on Jun. 3, 2015, which claims priority to foreign French patent application No. FR 1455028, filed on Jun. 3, 2014, the disclosures of which are incorporated by reference in their entirety.

FIELD OF THE INVENTION

The invention relates to the safety of use of a humanoid-type robot.

BACKGROUND

A robot can be qualified as humanoid from the moment when it has certain attributes of the appearance and functionalities of a human being such as, for example, a head, a trunk, two arms, two hands, two legs or two feet. Some robots that have only the height of the body can also be considered to be of humanoid type. Humanoid robots are capable of walking or moving around on a platform provided with wheels, of making gestures, with the limbs or with the head. The complexity of the gestures that they are capable of performing is constantly increasing.

These robots are intended to interact with humans and it is necessary to avoid having the gestures of the robots being able to injure the humans around them. More specifically, in the movement of certain articulations of the robot, the latter could pinch human fingers located in proximity. For example, when the arm of a robot approaches its trunk, there is a risk of catching between the arm and the trunk. More generally, the risk of catching exists between two mutually articulated elements of the robot.

Some solutions have been devised to reduce the risk of catching or to limit the consequences thereof. To avoid any catching, it is possible to limit the travel of an articulation by abutment means making it possible to retain a sufficient gap between the elements linked by the articulation concerned. This solution limits the possibilities of the robot by preventing it from certain movements. The anthropomorphism of the robot is then degraded.

To limit the consequences of catching it is possible to reduce the force produced by the actuator moving the articulation concerned. This force reduction also limits the possibilities of the robot which, for example, will no longer be able to lift significant loads. It is possible to limit the force of an actuator only at end of travel, when the two elements approach each other. This limitation entails a complex driving of the actuator. This driving is costly to implement and can be the source of reduced robot reliability.

SUMMARY OF THE INVENTION

The invention aims to improve the operational safety of a robot by means of a completely passive solution making it possible to limit the pinching force at end of travel of a travel of an articulation.

To this end, the subject of the invention is a humanoid-type robot comprising two elements and an articulation with at least one degree of freedom linking the two elements, the two elements each comprising a skin delimiting their outer surface, the articulation allowing a travel within a given range, a first of the two elements being intended to come substantially into contact with a zone of the skin of a second of the two elements at an end of the range. The zone is flexible so as to allow the deformation thereof by a given distance with a force less than a given force and in that the first element is attached to the second element by passing through the flexible zone.

The flexible zone can be configured to remain in contact either with the articulation, or with the first element.

The robot can comprise an abutment belonging to one of the two elements. At the end of the range, the other of the two elements comes into contact with the abutment.

The skins of the two elements are mostly rigid and, advantageously, at least one flexible zone is arranged in the continuity of a rigid zone of the skin.

The flexible zone is discontinuous within a closed line. The first element passes through the skin through the discontinuity of the flexible zone and a rigid zone of the skin surrounds the flexible zone all along the closed line.

BRIEF DESCRIPTION OF THE DRAWINGS

The invention will be better understood and other advantages will become apparent on reading the detailed description of an embodiment given by way of example, the description being illustrated by the attached drawing in which.

For clarity, the same elements will bear the same references in the different figures.

DETAILED DESCRIPTION

Figure 1A:
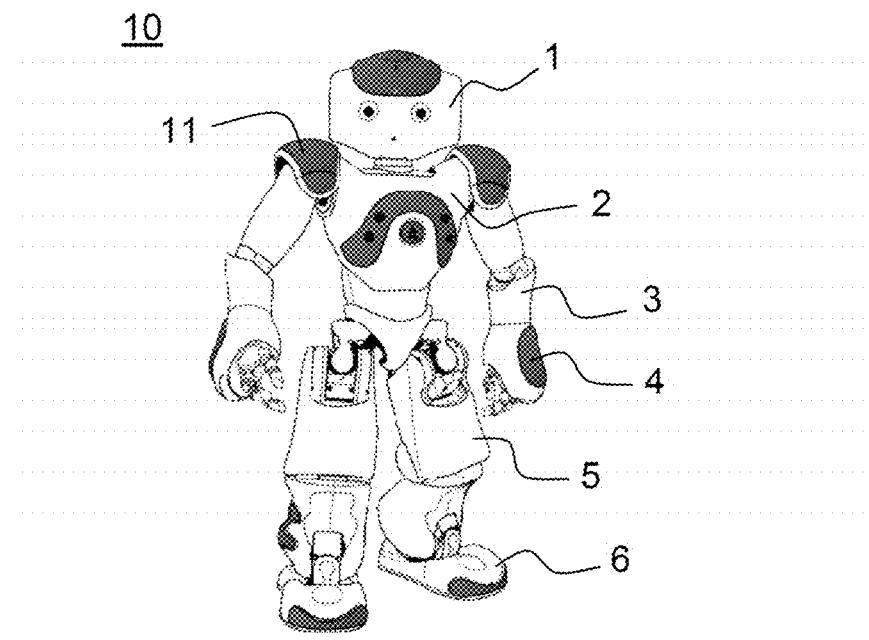
FIGS. 1a and 1b represent two examples of robots implementing the invention.
Figure 1B:
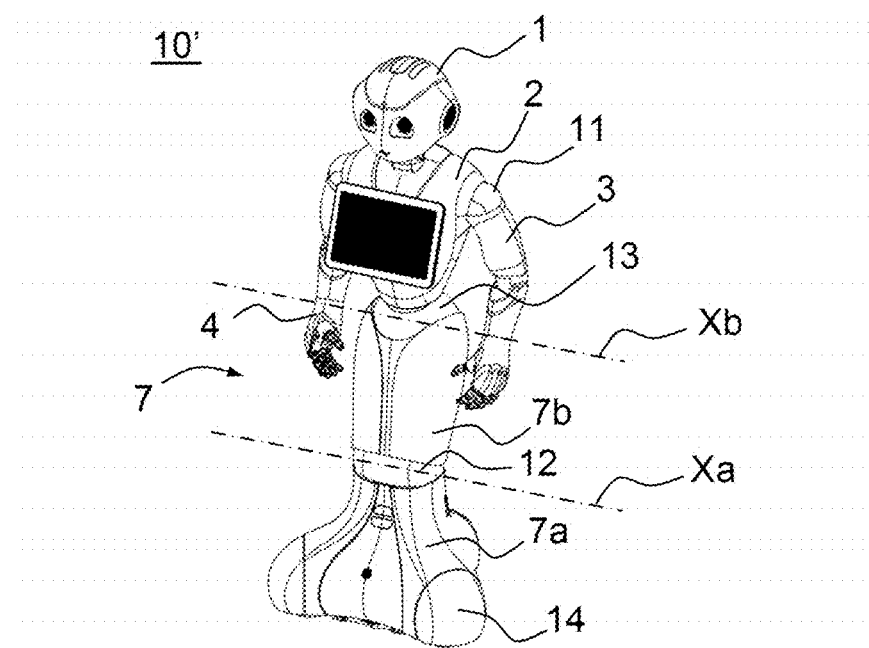

FIGS. 1a and 1b represent two examples of humanoid-type robots developed by the company ALDEBARAN ROBOTICS™. The humanoid robot 10 represented in FIG. 1a comprises a head 1, a trunk 2, two arms 3, two hands 4, two legs 5 and two feet 6. The humanoid robot 10' represented in FIG. 1b comprises a head 1, a trunk 2, two arms 3, two hands 4 and a skirt 7. These two robots comprise several articulations allowing the relative movement of the different limbs of the robot in order to reproduce the human morphology and its movements. The robots 10 and 10' comprise, for example, an articulation 11 between the trunk 2 and each of the arms 3. The articulation 11 forming a shoulder of the robot is motorized about two axes of rotation to make it possible to move the arm 3 relative to the trunk 2 in the manner of the possible movements by a shoulder of a human being.

The humanoid-type robot 10 also comprises several articulations for moving the legs of the robot and reproducing the walking movement, in particular articulations that can be likened to a hip, between the trunk and each of the thighs, to a knee, between a thigh and the leg, and to an ankle between the leg and the foot. Several forms of motorized articulations are implemented, driving in movement one of the limbs according to one or more degrees of freedom in rotation.

The humanoid-type robot 10' has a different architecture. To improve the stability and lower the center of gravity of the robot, the robot does not comprise any legs but a skirt 7, comprising in its base a tripod 14 capable of moving the robot. The skirt 7 also comprises a first articulation 12 like a knee, between a leg 7a and a thigh 7b. A second articulation 13 like a hip is links the trunk 2 and the thigh 7b. These two articulations 12 and 13 are pivot links motorized about an axis of rotation. The axis of rotation Xa of the articulation 12 and the axis of rotation Xb of the articulation 13 are substantially parallel to an axis linking the two shoulders of the robot, making it possible to tilt the robot forward or backward.

Figure 2A:
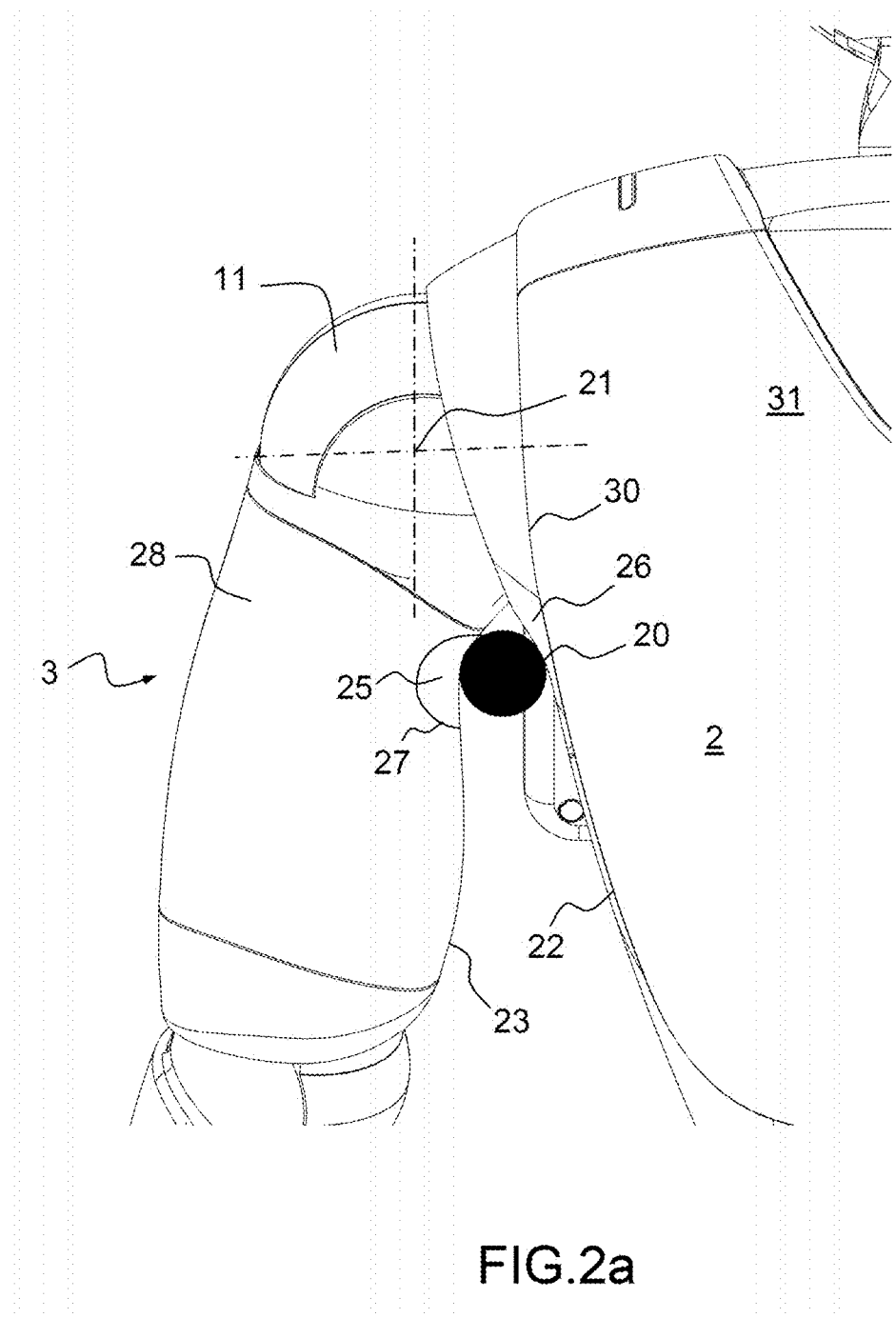
FIGS. 2a and 2b represent a shoulder of the robot of FIG. 1b.
Figure 2B:
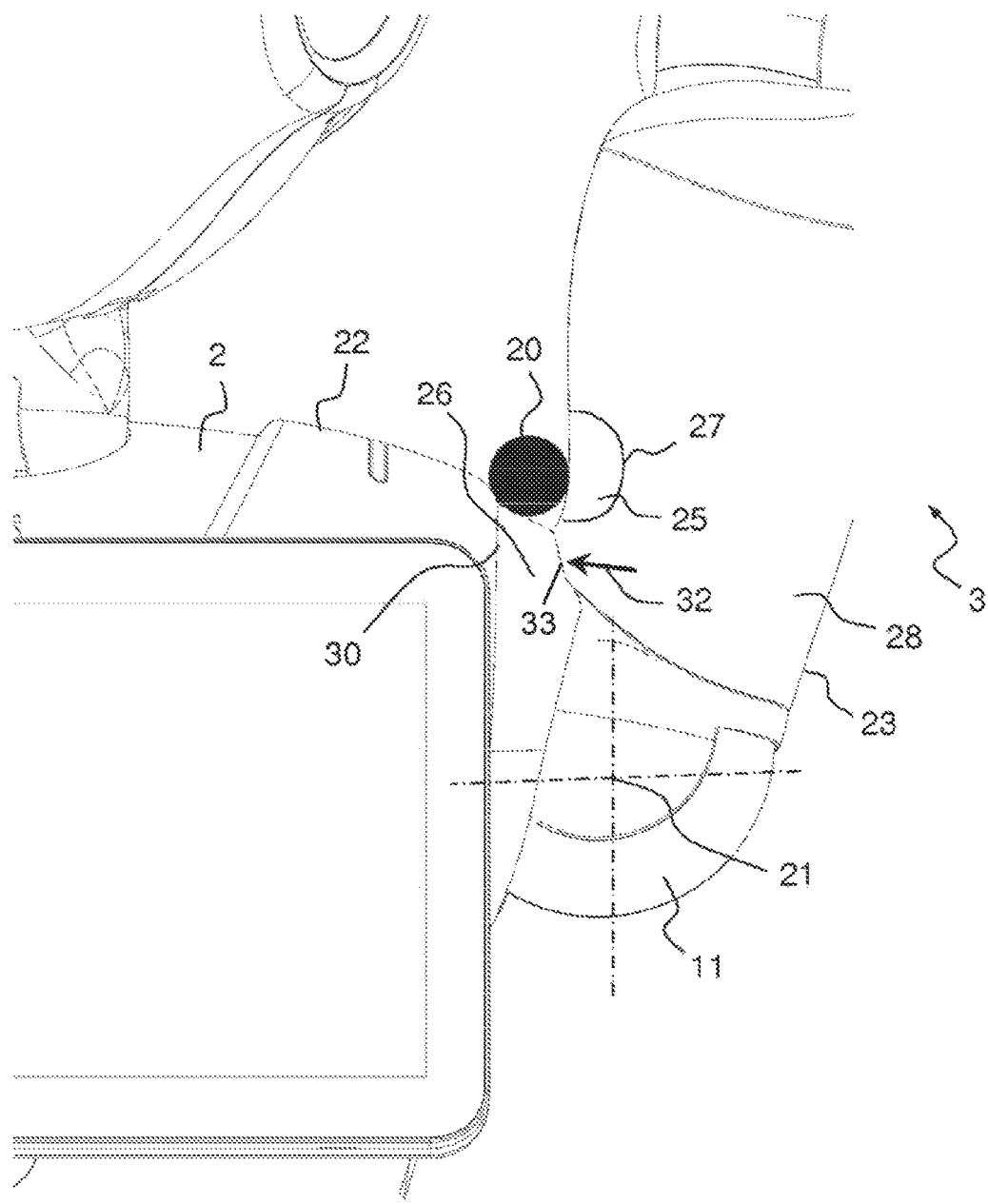

FIGS. 2a and 2b represent, in more detail, the shoulder 11 of the robot 10'. On of the those figures, an object 20 has been represented with circular section representing a human finger likely to be pinched between the trunk 2 and the arm 3. The object 20 is represented in cross section on both figures. In practice, the object 20 can be a standardized gauge representing a human finger. This gauge must not by be pinched too strongly between two elements of the robot. More specifically, the robot must not exert on the gauge a force greater than a given force.

In FIG. 2a, the object 20 is arranged under the arm 3 in the armpit of the robot 10'. The arm 3 tends to fold back along the trunk 2, pinching the object 20 under the armpit between the arm 3 and the trunk 2. In the example represented in FIG. 2a interest is focused on the rotation of the articulation 11, about a horizontal axis 21 at right angles to the frontal plane of the robot 10'. The frontal plane is parallel to the plane of FIG. 2a and the horizontal axis 21 is at right angles to the plane of the figure. The articulation 11 allows an angular travel within a given range about the axis 21. The arm 3 can have a travel of the order of 180°. The invention makes it possible to limit the effects of the pinching of the object 20 when the arm 3 arrives at end of travel at an end of the range, here, when the arm 3 is along the trunk 2. It is of course understood that the invention applies also to the other end of the range of rotation about the axis 21, as will be seen using FIG. 2b, for the rotation about the other axis of rotation of the articulation 11 about a vertical axis and, generally, for any combined movement of the two rotations of the articulation 11.

The outer surface of the trunk 2 and of the arm 3 forms a skin, respectively 22 and 23. At end of travel, when the arm 3 extends along the trunk 2, the skin 23 of the arm 3 and the skin 22 of the trunk 2 come substantially into contact with one another. More specifically, there is, for each skin, a zone where the gap between the two skins is less than the section of the object 20. This zone bears the reference 25 for the skin 23 of the arm 3 and the reference 26 for the skin 22 of the trunk 2. According to the invention, one of the zones 25, 26 or both zones 25, 26, intended to come into contact, are flexible so as to allow the deformation thereof by a given distance with a force less than a given force. The given distance is the section of the object 20. The given distance is, for example, of the order of 5 mm, representing the diameter of the finger of a child. The given force represents the maximum force that can be allowed in the pinching of the object 20.

The deformation of the zone or of the zones 25, 26, of the skin concerned, is done in their respective elastic domain so as to resume their initial form when the arm 3 leaves its end-of-travel position relative to the trunk 2. In the absence of the object 20, there can be a slight gap between the zones 25 and 26 of the skins 22 and 23, a contact without force or even a light pressure between the zones 25 and 26.

The presence of these flexible zones 25 and 26 allows the robot to approximate the human morphology. The flexible zones 25 and 26 of the skin can be formed from membranes produced in an elastomer material such as, for example, based on silicone or on rubber.

The end of travel of the articulation 11 can be produced by a driving of an actuator allowing the movement of the articulation 11 or by a mechanical abutment 33 arranged inside the articulation 11.

In the example represented, the flexible zone 25 is continuous within a closed line 27 which limits it. A rigid zone 28 of the skin 23 surrounds the flexible zone 25 all along the closed line 27. For the arm, 3, the skin 23 is mainly rigid. One or more flexible zones 25 are arranged on the skin 23. These zones 23 are located at points where the arm 3 is likely to come substantially into contact with another element of the robot 10', the trunk 2 in this case.

The flexible zone 26 of the trunk 2 is discontinuous within a closed line 30 which limits it. The arm 3 passes through the skin 22 of the trunk through the discontinuity of the flexible zone 26. A rigid zone 31 of the skin 22 surrounds the flexible zone 26 all along the closed line 30. In other words, the skin 22 of the trunk 2 is, as for the arm 3, mainly rigid. The flexible zone 26 is fixed to the rigid zone 31 along the closed line 30. The flexible zone 26 forms a skirt fixed to the rigid zone 22 and surrounding the attachment of the arm 3 to the trunk 2. By completely surrounding the arm 3, the flexible zone 26 allows the arm 3 to approach the trunk 2 in all the combinations of rotation of the articulation 11. Furthermore, by virtue of its skirt form, the flexible zone 26 makes it possible to limit the penetration of undesirable objects into the articulation 11. To this end, the flexible zone 26 is configured to remain in contact with the attachment of the arm 3 to the trunk 2. The flexible zone 26 can remain in contact either with the articulation 11, or with the arm 3. The flexible zone 26 notably makes it possible to protect the articulation 11 from ambient dust. The flexible zone 26 also makes it possible to confine any defects that can occur inside the robot. This can for example be the start of a fire linked to an electrical fault and the retention inside the robot of any broken mechanical parts.

FIG. 2b represents the arm 3 extending substantially vertically upward. The arm 3 is at end of travel of its rotation about the axis 21 at the end of its range of rotation, the end opposite that represented in FIG. 2a. The rigid zone 28 of the skin 23 of the arm 3 is depressed slightly into the flexible zone 26 of the skin 22 of the trunk 2. This depression is visible at the level of the arrow 32. In this figure, the object 20 has been represented pinched between the shoulder and the arm 3. To limit the consequences of the pinching of the object 20, the arm 3 can comprise a second flexible zone 25. On the trunk 2, the object 20 is depressed into the flexible zone 26 of the trunk 2.

More generally, the trunk 2 and/or the arm 3 have as many flexible zones as necessary situated at the points or the skins of these two elements (trunk 2 and arm 3) can approach each other or even enter into collision in the different movements of the arm 3 relative to the trunk 2. The skin of the arm 3 and of the trunk 2 is mostly rigid. The flexible zone or zones 25, 26 which is/are produced thereon are arranged in the continuity of the rigid zones, respectively 28 and 31.

Figure 3:
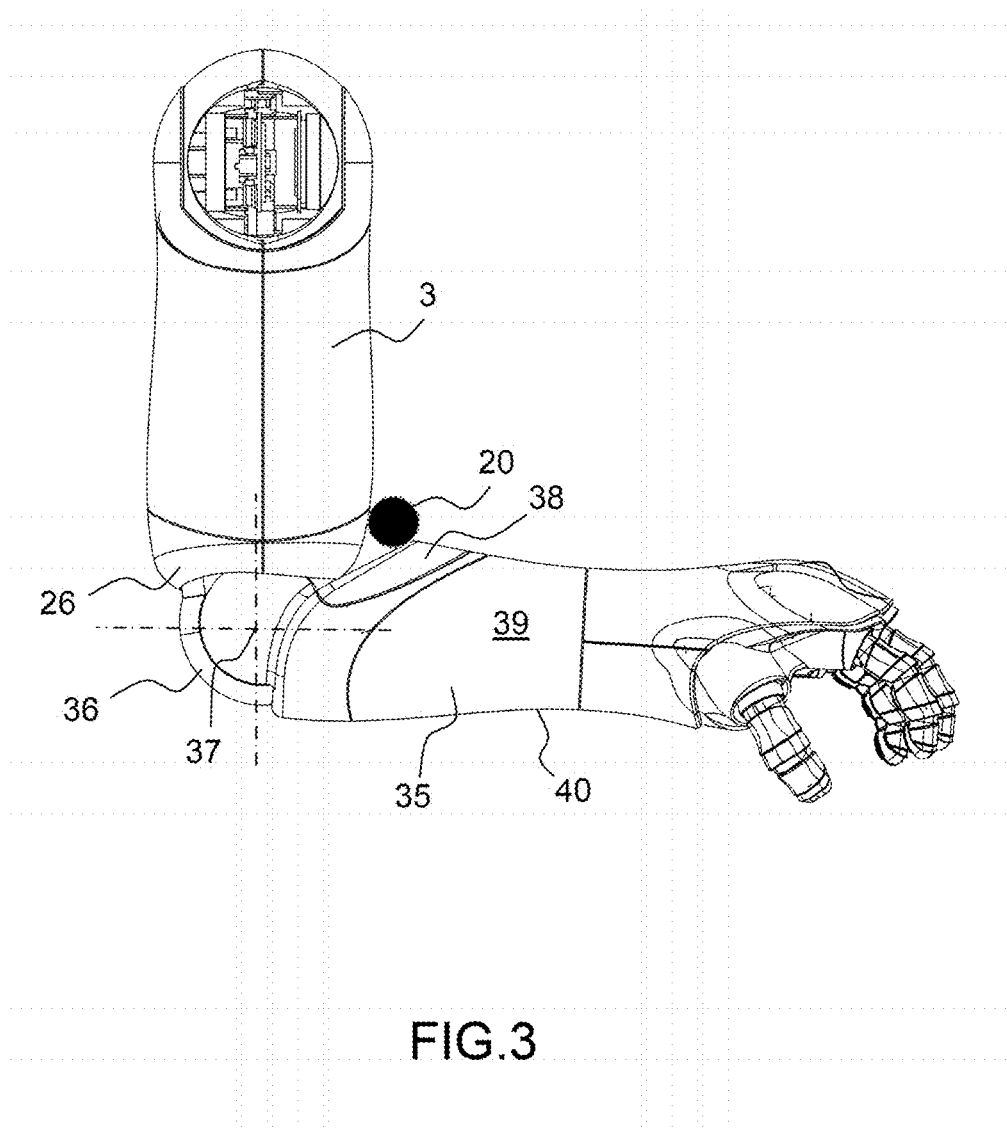
FIG. 3 represents an arm of the robot of FIG. 1b.

FIG. 3 represents the arm 3 linked to a forearm 35 of the robot 10'. An elbow 36 ensuring the rotational mobility about an axis 37 at right angles to the plane of FIG. 3 links the arm 3 and the forearm 35. On the arm 3, there is a flexible zone 26 in skirt form through which the elbow 36 extends. On the forearm 35, a flexible zone 38 follows a rigid zone 39 of the skin 40 of the forearm 35. The flexible zone 38 can completely surround the forearm 35 and follow a closed line thereof. Alternatively, the flexible zone 38 can follow only partly the closed line limiting the rigid zone 39. The flexible zone 38 is then in the form of a lip arranged at the level where the forearm 35 most closely approaches the arm 3 in the rotation of the elbow 36 in a first direction of rotation. In a rotation in the opposite direction to the first direction, the forearm 35 comes substantially into the alignment of the arm 3. On the back of the elbow 36, it is possible to dispense with any flexible zone on the forearm 35. The flexible zone 26 of the arm 3 can suffice to avoid any damage due to the pinching. It is advantageous to provide for the flexible zone to completely surround the elbow 36 even if the elbow 36 has only a single degree of freedom in rotation. A part of the flexible zone 26 has no anti-catching function but retains its functions of protection against foreign bodies and of containment of faults inside the robot.

Figure 4:
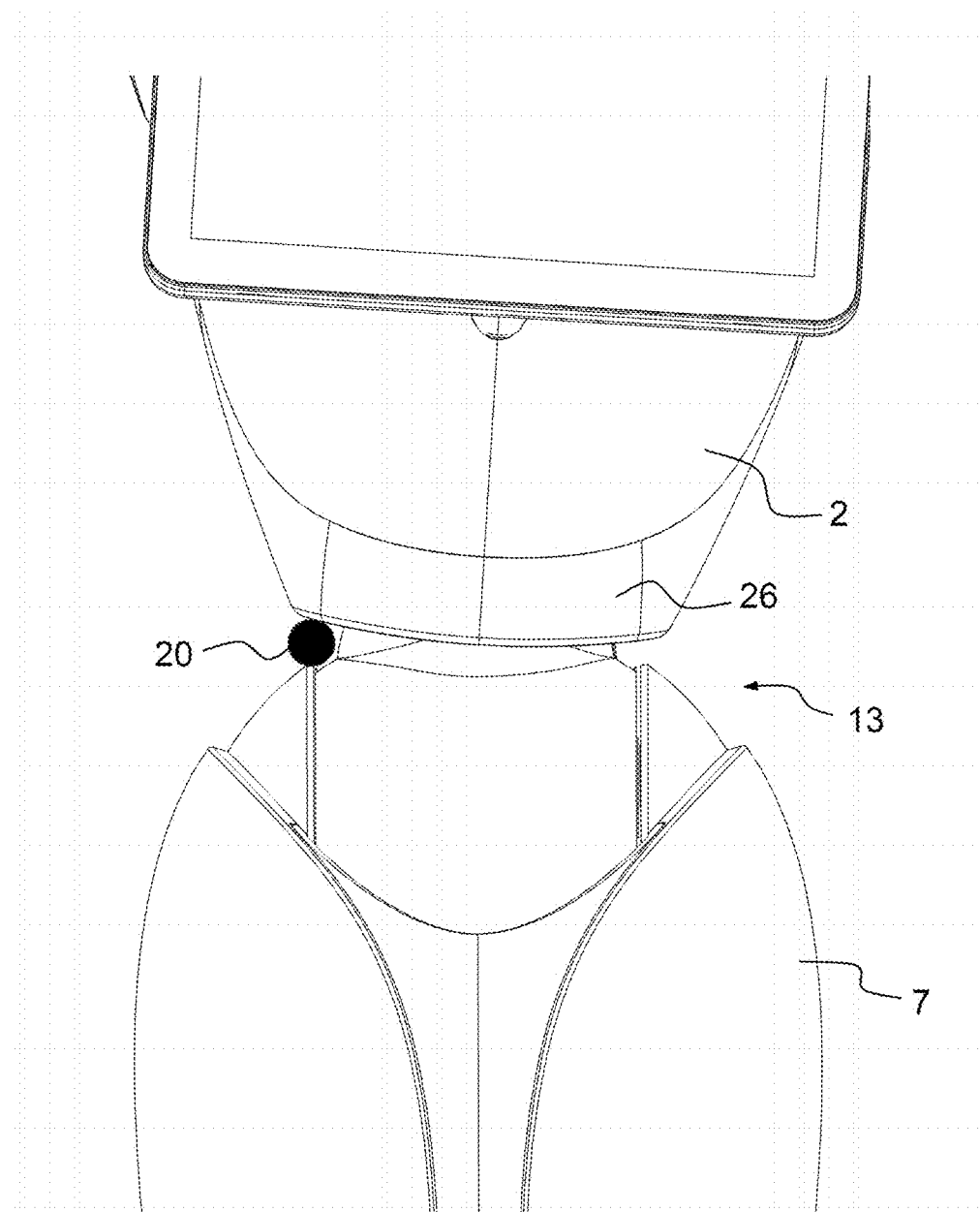
FIG. 4 represents a hip of the robot of FIG. 1b.

FIG. 4 represents, in more detail, the hip 13 of the robot 10'. The hip 13 can have one or two degrees of freedom between the trunk 2 and the skirt 7. There can be a similar configuration with a hip in the robot 10 having two legs 5. The range of angular travel of the hip 13 is for example less than 90°. For such an angular travel, a flexible zone on the skin of one of the elements of the robot linked by the hip can suffice. In the example represented, a zone 26 forms the bottom part of the trunk 2. As for the shoulder 11 or the elbow 36, the zone 26 here encircles the trunk 2 about its vertical axis.

The invention claimed is:

1. A humanoid robot comprising:
   first and second elements, each of the first and second elements comprising a skin delimiting an outer surface having a flexible zone and a rigid zone; and
   an articulation linking the first and second elements and allowing a travel of at least one of the first and second elements with at least one degree of freedom and within a given range,
   wherein an end of the range is defined by the flexible zone of the first element being separated from the flexible zone of the second element by a gap in the absence of an object, and the first element is attached to the second element by passing through the flexible zone of the second element.

2. The humanoid robot of claim 1, wherein the flexible zone of the second element is configured to remain in contact with the articulation or the first element.

3. The humanoid robot of claim 1, wherein one of the first and second elements comprises an abutment, and the other of the first and second elements comes into contact with the abutment at the end of the range.

4. The humanoid robot of claim 1, wherein the flexible zone of at least one of the first and second elements is arranged in a continuity of the rigid zone of the at least one of the first and second elements.

\* \* \* \* \*